Figure 1:
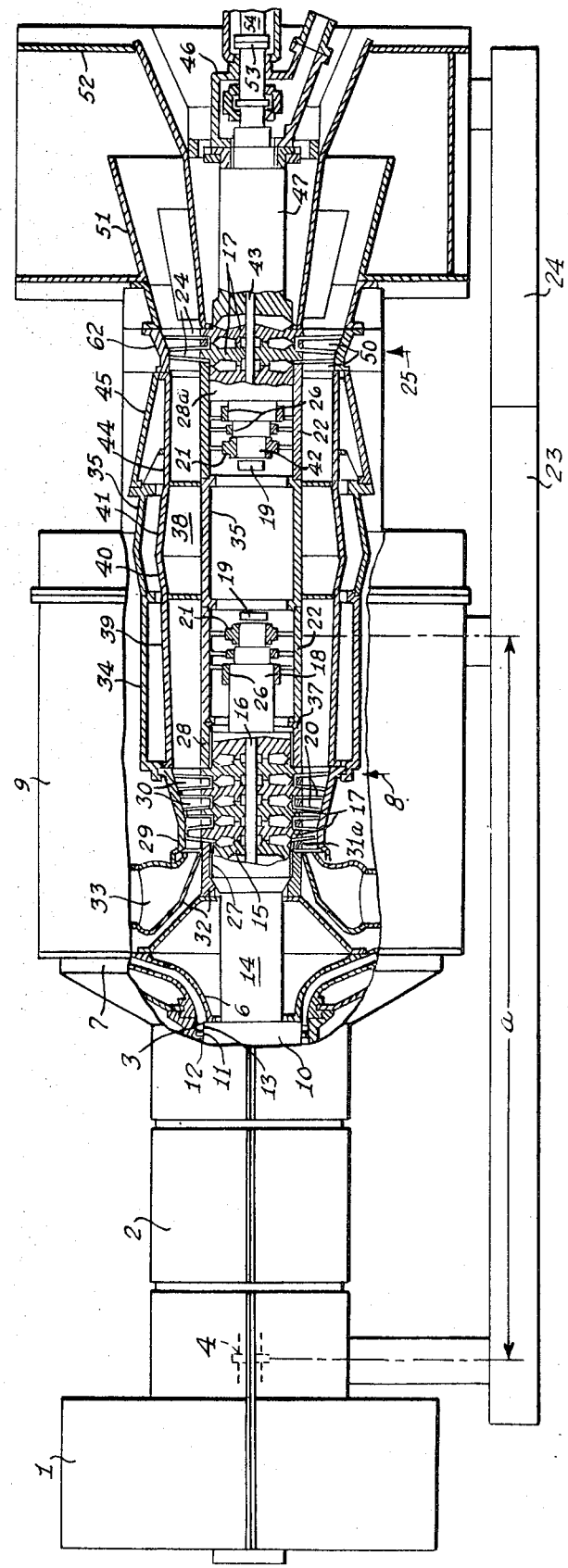

United States Patent

[11] 3,586,459

| [72] | Inventor | Ferdinand Zerlauth<br>Winterthur, Switzerland |
| [21] | Appl. No. | 820,435 |
| [22] | Filed | Apr. 30, 1969 |
| [45] | Patented | June 22, 1971 |
| [73] | Assignee | Sulzer Brothers, Ltd.<br>Winterthur, Switzerland |
| [32] | Priority | May 20, 1968 |
| [33] | | Switzerland |
| [31] | | 7489/68 |

[54] MULTISTAGE GAS TURBINE FOR CONVERSION FROM A SINGLE-SHAFT TO A TWO-SHAFT TURBINE
5 Claims, 4 Drawing Figs.

[52] U.S. Cl. ................................................. 415/60,
415/170, 415/198, 60/39.16
[51] Int. Cl. ..................................................... F01l 13/00,
F01l 25/16

[50] Field of Search ............................................. 60/39.16,
39.33; 415/61, 198, 170

[56] References Cited
UNITED STATES PATENTS

| 2,971,334 | 2/1961 | Carlson ........................ | 60/39.16 |
| 3,059,901 | 10/1962 | Snow et al. .................. | 415/198 X |
| 3,124,931 | 3/1964 | Mock ........................... | 60/39.16 |
| 3,423,048 | 1/1969 | Clarke et al. ................ | 60/39.16 X |

Primary Examiner—Henry F. Raduazo
Attorney—Kenyon & Kenyon, Reilly, Carr & Chapin

ABSTRACT: Various basic components of the turbine are made in standardized manners so as to be converted from a single-shaft turbine to a two-shaft turbine and vice versa. The rotor discs are made to be incorporated as a last stage in a compressor turbine or incorporated in the useful power turbine when the second shaft is added.

INVENTOR.
FERDINAND ZERLAUTH

INVENTOR.
FERDINAND ZERLAUTH

MULTISTAGE GAS TURBINE FOR CONVERSION FROM A SINGLE-SHAFT TO A TWO-SHAFT TURBINE

This invention relates to a multistage gas turbine and more particularly to a turbine which can be converted from a single-shaft to a two-shaft turbine and vice versa.

Single-shaft gas turbines have generally been used as drive unit where the power consumer connected thereto has required a constant speed, for example, in driving the generator of a power plant. On the other hand, two-shaft gas turbines with separate compressor and useful power turbines have been used where the operating machine connected thereto works with a variable rotary speed, for example, the drive of pumping equipment in oil or gas pipelines.

Briefly, the invention is directed to the problem of obtaining a form of gas turbine construction which has basic elements for use in single- and two-shaft turbines. The basic elements obtained by the invention are as simple as possible so as to be used in both turbine versions when supplemented by special additional elements adapted to the specific version. This affects a substantial standardization of the fabrication, for example, through serial manufacture, as well as a simpler and more economical stocking of parts, for example, for replacement part service.

The invention is characterized in that the rotor discs which carry the vanes for the various turbine stages and the input side rotor shaft journal of the useful power turbine, as well as the bearing housings mounting the journals, are made in such a way that the rotor discs and the rotor shaft journal of the useful power turbine of a two-shaft turbine can be set on the last stage of the rotor of the compressor turbine of a single shaft turbine.

Additional advantages in the direction of further standardization can be obtained when the bearing housings mounting the rotor shaft journals are the same for both forms of construction, and are, in the case of the two-shaft design, installed mirror-image fashion at two opposite sides of a central housing. It is moreover advantageous to make the rotor discs of all the turbine stages alike, and to space their vane root grooves at the same spacing. Moreover, all the rotor vanes or blades may with both constructions have the same blade profile and the same blade root, whereby at least the rotor blades of the compressor turbine or of the first turbine stages corresponding to this, and the rotor blades of the useful power turbine or of the last turbine stages corresponding to this, have the same profile angle as one another. These measures make it possible, for the fabrication of all the rotor blades, to use a single blade profile with, at most, two different profile angles, so that only the blade length need be varied in arranging the blade in the individual stages.

Both forms of construction may also have the same guide vane carrier for the compressor turbine or for the first turbine stages corresponding to this. Thus, in the case of the single-shaft turbine construction, an extension part is set concentrically on the output end of this guide vane carrier to support the added guide vanes. Supplementing this, the guide vane of each stage of at least the compressor turbine or of the first turbine stages corresponding to this may be made the same with both forms of construction.

In addition, the bearings spacing of the compressor rotor is the same in both designs. This provides an additional advantage in that the outer parts of the stator housing, i.e. from the induction housing to the central housing, are the same with both forms of construction. Consequently, in both cases, the same machine bed can be used with only a need to add an auxiliary machine bed for the useful power turbine in the two-shaft construction. Finally, both designs utilize the same waste gas housing.

Figure 2:
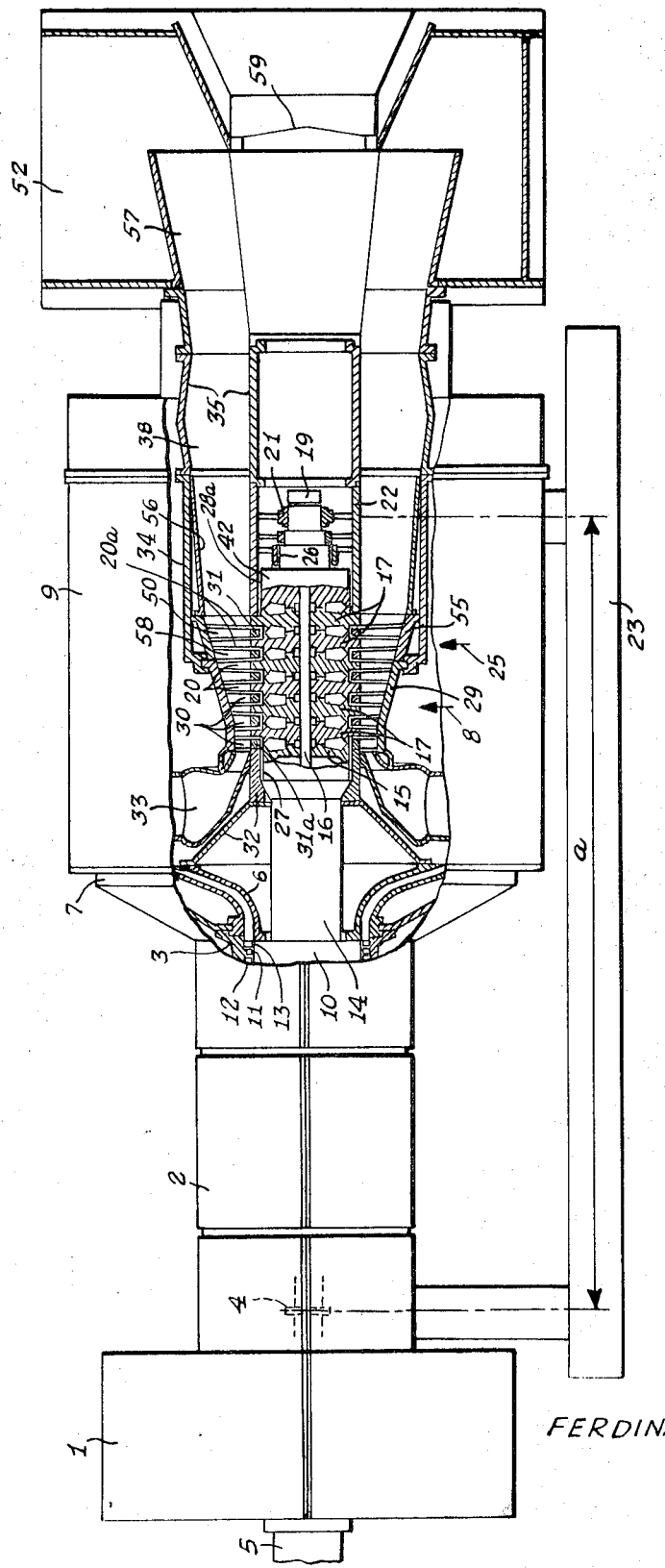
Figure 3:
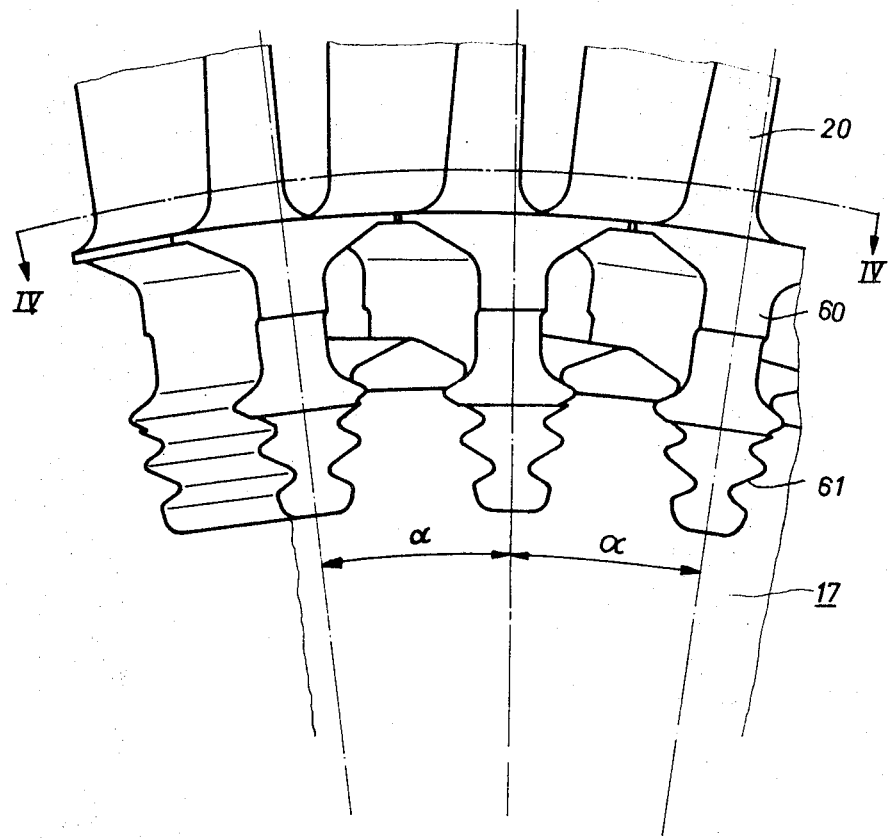
Figure 4:
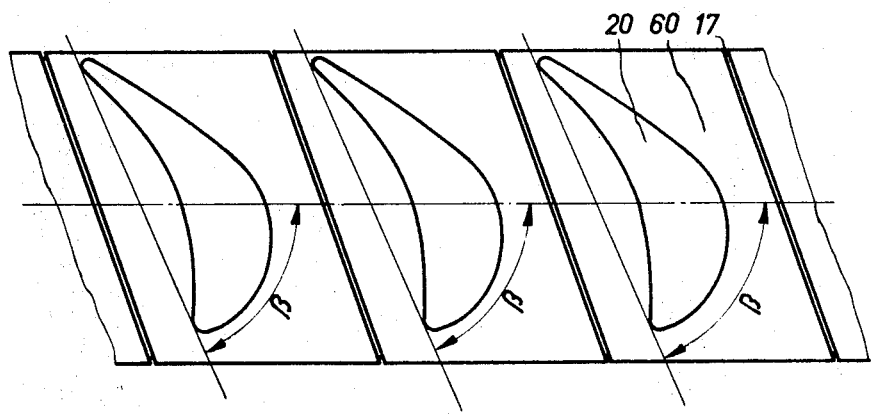

These and other objects and advantages of the invention will become more apparent from the following detailed description and appended claims taken in conjunction with the accompanying drawings in which:

FIG. 1 schematically illustrates a two-shaft turbine construction according to the invention;

FIG. 2 schematically illustrates a single-shaft turbine construction according to the invention;

FIG. 3 illustrates a fragmentary view of a rotor disc according to the invention; and FIG. 4 illustrates a view taken on line IV–IV of FIG. 3.

Referring to FIG. 1, the two-shaft multistage gas turbine is constructed with an induction housing 1, a compressor 2, a diffuser 6, a compressor drive turbine 8 within a combustion chamber system 9, a useful power turbine 25 within a housing 45, and a waste gas housing 52 in coaxial alignment.

The induction housing 1, shown in outline and divided along a horizontal axial plane for simplicity, is connected in the direction of flow to the compressor 2, also shown in outline for simplicity. In addition, the compressor 2 has a rotor bearing 4 on the induction housing side which is supported on a machine bed 23 in a suitable manner.

The compressor 2 has a housing which surrounds a guide vane support 3 and which merges into a front housing 7 surrounding the diffuser 6. In addition, the compressor 2 includes a rotor 10 (the last stage 11 of the rotor 10 being shown between its last two guide vane stages 12, 13) which ends in a connection part 14 and which is adjoined at the downstream face by a transition disc 15 within the combustion chamber system 9 to connect the compressor 2 to the drive turbine 8. A tension anchor or tie rod 16 is anchored in the connection part 14 so as to mount and hold together, with the aid of a tie rod head 19, a plurality of rotor discs 17 and a shaft journal 18 of the drive turbine 8. For purposes of clarity, the details of this anchorage is not shown; however, it is noted that any suitable anchorage as is known can be used.

The individual rotor discs 17 are similar to one another and are fastened to one another and to the transition disc 15 and also to the shaft journal 18, as is known, by radial serrations. The rotor discs 17 serve to carry rotor vanes or blades 20, all of which have the same blade profile and the same blade root; the profile angles of the blades 20 of the stages of the turbine 8 are equal also.

The shaft journal 18 is mounted in shaft bearings 21 which are supported in a bearing housing 22. The distance $a$ between the bearings 4, 21 for the rotor 10 is a fixed distance as will be indicated hereinafter, so that a standardized outer housing and standardized machine bed 23 are used. In addition, an auxiliary bed 24 is mounted in adjoining relation to the bed 23 to serve as a support for the useful power turbine 25.

Each bearing housing 22 is also provided with two labyrinth seals 26 while additional labyrinth seals 27, 28 for sealing the rotor 10 are disposed between the transition disc 15 and a centering support 32 having a foremost conical portion, secured to the diffuser housing 7, and between the shaft journal 18 and an adapter piece 37, respectively.

The rotor discs 17 of the turbine 8 are surrounded by a guide vane carrier 29 in which a plurality of guide vanes 30 are fastened. Each of the guide vanes ends in a guide vane ring 31 which is disposed between the individual rotor discs 17 and which forms the inner limit of the flow channel for the combustion gases in the region of the turbine 8. Moreover, the first guide vane ring 31a in the path of flow is connected with the adjacent hollow cylinder centering support 32. The centering support 32 thus also serves to center the inflow end of the guide vane carrier 29 relative to the rotor 10.

In order to direct the hot combustion gases coming out of the combustion chamber system 9 into the turbine 8, an inflow housing 33, as is known, is disposed at the upstream end of the turbine.

The outflow end of the guide vane carrier 29 is carried in a casinglike intermediate part 34 which is secured to a central housing 35 situated at the downstream end. The central housing 35 has internal parts which cooperate with the bearing housing 22 and an additional adapter piece 37 to define the inner limit of the flow channel 38 for the gases. The adapter piece 37 serves to bridge over the space between the bearing housing 22 and the last rotor disc 17 of the compressor turbine 8. The flow channel 38 is delimited at the outside, as far as the central housing 35, by a sheet metal casing 39 which is secured to and between the guide vane carrier 29 and the central housing 35. In addition, a pair of conical casing parts 40, 41 which are disposed in opposite sign to each other extend from the casing 39 to further define the flow channel 38.

In this coaxial shaft turbine, a second bearing housing 22 adjoins the downstream end of the central housing 35. This second bearing housing 22 mounts the inflow side of a rotor shaft journal 42 of the useful power turbine 25 and is surrounded by a casing 44 which serves to define the flow channel 38 as by a housing part 45. The useful power turbine 25, for example, a two-stage turbine, is composed of a rotor 47 mounted in a bearing 46, rotor discs 17 which carry blades 20a similar to the blades 20 described above (at least having the same blade root and blade profile as above), and the shaft journal 42. These components, as with the above turbine 8, are held together by a tension anchor or tie rod 43 which is anchored in the rotor part 47 and which has a tie rod head 19. The turbine rotor 47 is surrounded by a guide vane carrier 49 which carries adjustable guide vanes 62 for the first stage and fixed guide vanes 50 for the second stage.

In addition, a waste gas diffuser 51 is disposed adjacent the guide vane carrier 49 to surround the rotor 47. This diffuser 51 has an outlet which opens into the waste gas housing 52.

Finally, the rotor 47 is connected via a coupling 53 to a shaft 54 of a work machine (not shown).

Referring to FIG. 2, wherein like reference characters have been used to indicate like parts, a single-shaft turbine can be constructed by a conversion of the two-shaft turbine described above. That is, the rotor 10 of the compressor 2 is connected at the upstream end of the induction housing 1 to the shaft of a work machine (not shown) via a coupling 5. In addition, a second turbine 25 is adjoined to the downstream end of the turbine 8. This second turbine 25 has rotor discs 17 which are mounted on the shaft journal 42 and held together via the tie rod 16. These latter rotor discs 17 carry rotor vanes 20a which are of the same blade profile and blade root as the rotor vanes 20 of the upstream turbine 8.

A labyrinth seal 28a is also disposed between the shaft journal 42 and the bearing housing 22 in addition to the seal 26, 27 as described above.

In the case of this single-shaft turbine, the two turbine stages of the turbine 25 together with the shaft journal 42 (instead of the shaft journal 18 and adapter piece 37 of FIG. 1) adjoin the four-stage turbine 8 before adjoining the same bearing housing 22 as above. Furthermore, the guide vane carrier 49 need only have an elongated extension part 55 to carry the fixed guide vanes 50 and a shortened sheet metal casing 56, instead of the sheet metal casing 39, secured to the elongated part 55 in order to define the outer limit of the flow channel 38. The sheet metal casing 56 also ends at the central housing 35 so that the conical parts 40, 41 described above are eliminated.

It is noted that the guide vanes 50 can be used for either turbine described above. However, the guide vanes 62 of the first stage of the useful power turbine 25 need be replaced by other guide vanes 58 in the single-shaft turbine. This is necessary not only because the guide vanes 62 are adjustable but also because the upstream end of the guide vane carrier 49 in the region of the first guide vanes has a cylindrical inner contour whereas the elongated extension part 55 is conical.

The single-shaft turbine (FIG. 2) is further provided with a slightly different waste gas diffuser 57 while the waste gas housing 52 remains the same. Further, the waste gas housing 52 is enclosed by a covering metal sheet 59 instead of being open to carry the shaft 54 (FIG. 1) to the bearing 46 of the rotor 47.

Referring to FIG. 3, the rotor discs 17 have the same spacing angle $\alpha$ with respect to their blade root grooves 61 and receive the pine-treelike blade roots 60 of the blades 20, 20a (which roots are the same for all rotor discs 17). It is noted that the filler pieces between the blade roots 60 have been omitted for clarity from the arcuate segment of the rotor disc shown.

Referring to FIG. 4, the profile angle $\beta$, at least for the turbines 8 or 25, as shown, can be made the same for all stages.

The invention thus provides various basic turbine components which are standardized so as to be incorporated in two different forms of turbine construction. This provides a manufacturing advantage as well as other advantages as noted.

What I claim is:

1. A multistage gas turbine plant comprising
 a drive turbine having a drive turbine shaft journal and a first plurality of rotor discs for carrying blades mounted in said drive turbine upstream of said drive turbine shaft journal;
 a power turbine having a power turbine shaft journal coaxially spaced downstream from and of less length than said drive turbine shaft journal, said power turbine journal being of similar construction to said drive turbine shaft journal for mounting in said drive turbine in place of said drive turbine shaft journal; and a second plurality of rotor discs carrying blades mounted in said power turbine downstream of and adjacent to said power turbine shaft journal, each disc of said second plurality of rotor discs being of similar construction to said first plurality of rotor discs for mounting in said drive turbine between said first plurality of rotor discs and said power turbine shaft journal therein;
 A first bearing housing rotatably supporting said drive turbine shaft journal therein; and
 a second bearing housing rotatably supporting said power turbine shaft journal therein, said second bearing housing being of similar construction to said first bearing housing and means whereby upon mounting of said power turbine shaft journal in place of said drive turbine shaft journal with said second plurality of rotor discs between said first plurality of rotor discs and said first bearing housing rotatably mounting said power turbine shaft journal therein, the turbine plant is converted to a single shaft turbine.

2. A multistage gas turbine plant as set forth in claim 1 which further comprises a central housing disposed between said bearing housings with said bearing housings in symmetric relation therewith.

3. A multistage gas turbine plant as set forth in claim 1 which further comprises an adapter piece in bridging relation between the last rotor disc of said first plurality of rotor discs and said first bearing housing.

4. A multistage gas turbine plant as set forth in claim 1 which further comprises a compressor connected to said drive turbine shaft journal for rotation therewith, a rotor bearing rotatably mounting said compressor and a shaft bearing rotatably supporting said drive turbine shaft journal in said first bearing housing and being sized to rotatably support said power turbine shaft journal therein, said rotor bearing and shaft bearing being spaced apart a fixed distance.

5. A multistage gas turbine plant as set forth in claim 1 which further comprises a guide vane carrier surrounding said first plurality of rotor discs and an elongated extension part mounted on the downstream end of said carrier to surround said second plurality of rotor discs.